(12) United States Patent
Johnson

(10) Patent No.: US 8,130,300 B2
(45) Date of Patent: Mar. 6, 2012

(54) IMAGER METHOD AND APPARATUS HAVING COMBINED SELECT SIGNALS

(75) Inventor: Richard S. Johnson, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 1110 days.

(21) Appl. No.: 12/004,033

(22) Filed: Dec. 20, 2007

(65) Prior Publication Data

US 2009/0160990 A1    Jun. 25, 2009

(51) Int. Cl.
*H04N 3/14* (2006.01)
(52) U.S. Cl. ........................................ 348/308
(58) Field of Classification Search .................... 348/308
See application file for complete search history.

(56) References Cited

U.S. PATENT DOCUMENTS

| | | | |
|---|---|---|---|
| 6,218,656 B1 | 4/2001 | Guidash | |
| 6,423,994 B1 | 7/2002 | Guidash | |
| 6,466,266 B1 * | 10/2002 | Guidash et al. | 348/308 |
| 6,512,543 B1 * | 1/2003 | Kuroda et al. | 348/302 |
| 6,603,513 B1 * | 8/2003 | Berezin | 348/308 |
| 6,710,803 B1 * | 3/2004 | Kang | 348/245 |
| 6,864,557 B2 | 3/2005 | Turner et al. | |
| 6,930,337 B2 | 8/2005 | Rhodes | |
| 7,116,368 B2 | 10/2006 | Berezin et al. | |
| 7,176,434 B2 | 2/2007 | Altice, Jr. et al. | |
| 7,277,129 B1 | 10/2007 | Lee | |
| 7,391,453 B2 * | 6/2008 | Ohkawa | 348/302 |
| 2004/0096124 A1 * | 5/2004 | Nakamura | 382/308 |
| 2006/0256221 A1 | 11/2006 | Mckee et al. | |
| 2007/0029465 A1 | 2/2007 | Choi et al. | |
| 2007/0034939 A1 | 2/2007 | Lee et al. | |
| 2007/0040922 A1 | 2/2007 | McKee et al. | |
| 2007/0155081 A1 | 7/2007 | Shim | |
| 2007/0205356 A1 | 9/2007 | Gazeley | |
| 2007/0235631 A1 | 10/2007 | Ladd | |
| 2009/0237540 A1 * | 9/2009 | Johnson | 348/308 |
| 2009/0237541 A1 * | 9/2009 | Johnson et al. | 348/308 |

FOREIGN PATENT DOCUMENTS

| | | |
|---|---|---|
| EP | 0 977 426 A1 | 7/1999 |
| EP | 0 977 426 A1 | 2/2000 |

OTHER PUBLICATIONS

Christopher M. Scanlan, et al., "System-In-Package Technology, Application and Trends", amkor.com/products/notes_papers/SiP_TECHNOLOGY_APPLICATION_AND_TRENDS_Paper, Marketing@amkor.com, Jul. 2002.

* cited by examiner

*Primary Examiner* — Jason Chan
*Assistant Examiner* — Gary C Vieaux
(74) *Attorney, Agent, or Firm* — Nancy Y. Ru

(57) ABSTRACT

An imaging device and method for operating the device. The device comprises a pixel array having a plurality of pixels arranged in rows and columns and a plurality of readout circuits for the pixels. A reset circuit in one readout circuit is simultaneously operated with a row select circuit in another readout circuit using a common select line. A transfer select circuit may also be simultaneously operated with the common select line.

18 Claims, 15 Drawing Sheets

IMAGER METHOD AND APPARATUS HAVING COMBINED SELECT SIGNALS

FIELD OF THE INVENTION

Embodiments described herein relate generally to imaging devices having pixel arrays with pixels containing reset, row or transfer select transistors.

BACKGROUND OF THE INVENTION

Many portable electronic devices, such as cameras, cellular telephones, Personal Digital Assistants (PDAs), MP3 players, computers, and other devices include an imaging device for capturing images. One example of an imaging device is a CMOS imaging device. A CMOS imaging device includes a focal plane array of pixels, each one of the pixels including a photosensor, for example, a photogate, photoconductor or a photodiode overlying a substrate for accumulating photo-generated charge in the underlying portion of the substrate. Each pixel has a readout circuit that includes at least an output field effect transistor and a charge storage region connected to the gate of the output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference, and a row select transistor for selectively connecting the pixel to a column line.

In a CMOS imaging device, the active elements of a pixel perform the necessary functions of: (1) photon to charge conversion; (2) accumulation of image charge; (3) resetting the storage region to a known state; (4) transfer of charge to the storage region accompanied by charge amplification; (5) selection of a pixel for readout; and (6) output and amplification of a signal representing a reset level and pixel charge. Photo charge may be amplified when it moves from the initial charge accumulation region to the storage region. The charge at the storage region is typically converted to a pixel output voltage by a source follower output transistor.

FIG. 1 illustrates a typical four-transistor pixel 50 utilized in a pixel array of an imaging device, such as a CMOS imaging device. The pixel 50 includes a photosensor 52 (e.g., photodiode, photogate, etc.), transfer transistor 54, and readout circuit 51. The readout circuit 51 includes a storage node configured as a floating diffusion region N, reset transistor 56, source follower transistor 58 and row select transistor 60. The photosensor 52 is connected to the floating diffusion region N by the transfer transistor 54 when the transfer transistor 54 is activated by transfer select line 53 carrying a transfer select signal TX. The reset transistor 56 is connected between the floating diffusion region N and an array pixel supply voltage $V_{aapix}$. A reset select signal RST supplied over a reset select line 57 is used to activate the reset transistor 56, which resets the floating diffusion region N to a known state as is known in the art.

The source follower transistor 58 has its gate connected to the floating diffusion region N and is connected between the array pixel supply voltage $V_{aapix}$ and the row select transistor 60. The source follower transistor 58 converts the charge stored at the floating diffusion region N into an electrical output signal. The row select transistor 60 is controllable by a row select signal ROW supplied over a row select line 61 for selectively outputting the output signal OUT from the source follower transistor 58 to sample and hold circuit 46 via column line 45. For each pixel 50, two output signals are conventionally generated, one being a reset signal $V_{rst}$ generated after the floating diffusion region N is reset, the other being an image or photo signal $V_{sig}$ generated after charges are transferred from the photosensor 52 to the floating diffusion region N. Output signals $V_{rst}$, $V_{sig}$ are selectively stored in the sample and hold circuit 46 based on reset and pixel sample and hold select signals SHR, SHS.

Conventional CMOS imager designs, such as that shown in FIG. 1 for pixel 50, provide only approximately a fifty percent fill factor, meaning only half of the pixel 50 layout area comprises a photosensor utilized in converting light to charge carriers. The remainder of the pixel 50 includes the transfer transistor 54 and the readout circuit 51. As the total pixel area continues to decrease due to desired scaling, it becomes increasingly important to create photosensors that utilize as much of the pixel surface area as possible to increase quantum efficiency.

Accordingly, there is a desire for a pixel array architecture which has an improved fill factor and increased quantum efficiency.

DETAILED DESCRIPTION OF THE INVENTION

In the following detailed description, reference is made to various embodiments of the invention that are described with sufficient detail to enable those skilled in the art to practice them. It is to be understood that other embodiments may be employed, and that various structural, logical and electrical changes may be made. The progression of processing steps described is exemplary of embodiments of the invention; however, the sequence of steps is not limited to that set forth herein and may be changed as is known in the art, with the exception of steps necessarily occurring in a certain order.

Various embodiments described herein relate to a method and apparatus for reduced metal routing in an imager by combining the select line routing for the gates of reset, row and/or transfer select transistors of vertically aligned pixels. By connecting the gates of select transistors of vertically aligned pixels, metal lines are reduced thus allowing for more area for the photosensor and an increase in quantum efficiency. Furthermore, various embodiments discussed below include pixel arrays having pixel layouts in which multiple pixels share a readout circuit and in which the gates of select transistors of the readout circuits of different multiple pixel circuits have a combined select line.

The term "pixel," as used herein, refers to a photo-element unit cell containing at least a photosensor for converting photons to an electrical signal. For purposes of illustration, a small number of representative pixels are illustrated in the figures and description herein; however, typically fabrication of a large plurality of like pixels proceeds simultaneously. Accordingly, the following detailed description is not to be taken in a limiting sense, and the scope of the present invention is defined only by the appended claims. While not shown in this application, embodiments described herein should be understood to include dual conversion gain pixels and storage gate pixels.

Figure 2:
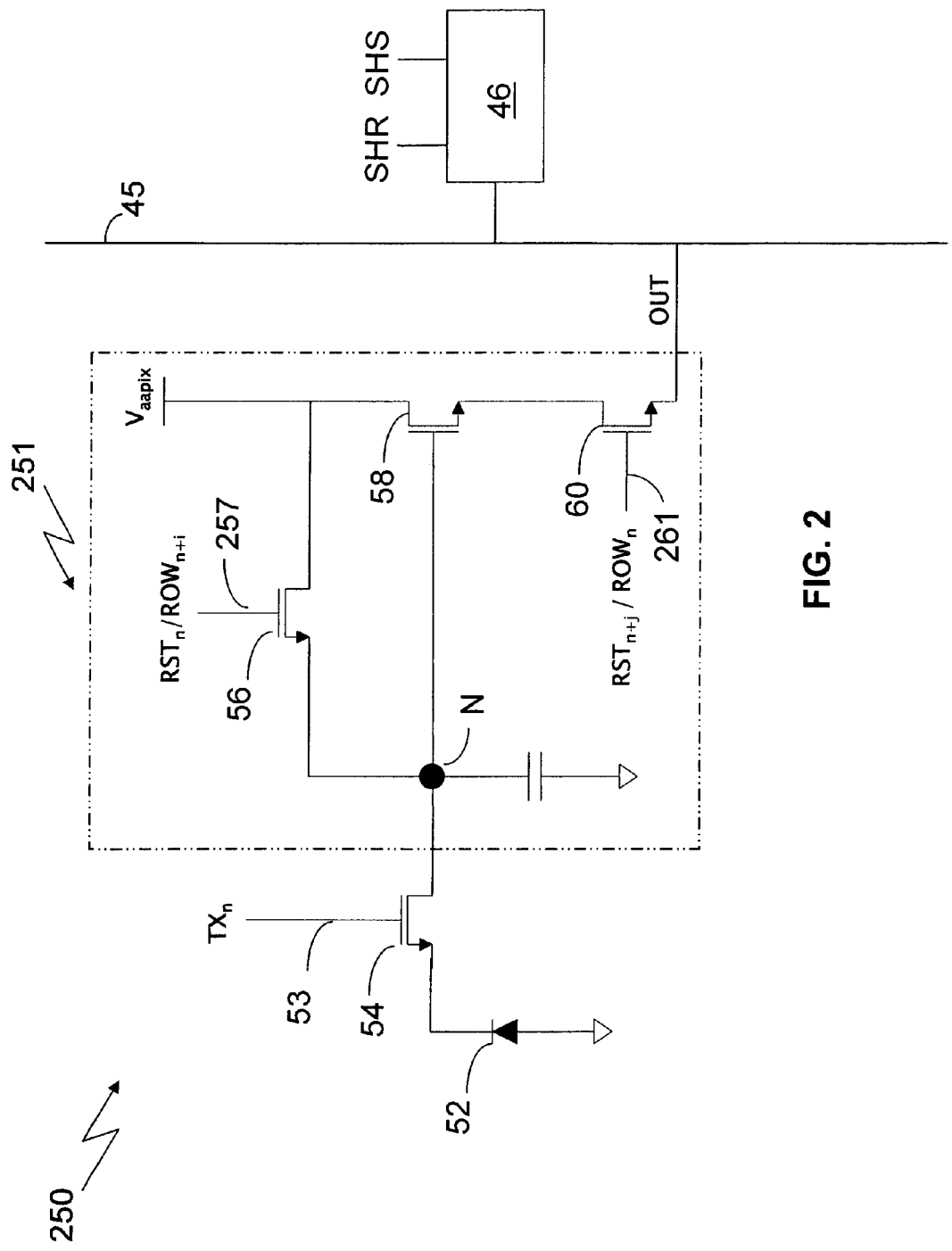
FIG. 2 is a diagram of a four-transistor pixel according to an embodiment described herein.

Now referring to the figures, where like reference numbers designate like elements, FIG. 2 illustrates an example of a pixel 250 constructed in accordance with a first embodiment. The pixel 250 includes a photosensor 52 (e.g., photodiode, photogate, etc.), transfer transistor 54, and readout circuit 251. The readout circuit 251 includes a storage region configured as a floating diffusion region N, reset transistor 56, source follower transistor 58 and row select transistor 60. The photosensor 52 is connected to the floating diffusion region N by the transfer transistor 54 when the transfer transistor 54 is activated by transfer select line 53 carrying a transfer select signal $TX_n$ which turns transfer transistor 54 on. The reset transistor 56 is connected between the floating diffusion region N and an array pixel supply voltage $V_{aapix}$. A reset select signal $RST_n$ supplied over a reset select line 257 is used to activate the reset transistor 56, which resets the floating diffusion region N to a known state as is known in the art.

The source follower transistor 58 has its gate connected to the floating diffusion region N and is connected between the array pixel supply voltage $V_{aapix}$ and the row select transistor 60. The source follower transistor 58 converts the charge stored at the floating diffusion region N into an electrical output signal. The row select transistor 60 is controllable by a row select signal $ROW_n$ supplied over a row select line 261 for selectively outputting the output signal OUT from the source follower transistor 58 to sample and hold circuit 46 via column line 45. For each pixel 250, two output signals are conventionally generated, one being a reset signal $V_{rst}$ generated after the floating diffusion region N is reset, the other being an image or photo signal $V_{sig}$ generated after charges are transferred from the photosensor 52 to the floating diffusion region N. Output signals $V_{rst}, V_{sig}$ are selectively stored in the sample and hold circuit 46 based on reset and pixel sample and hold select signals SHR, SHS.

Figure 1:
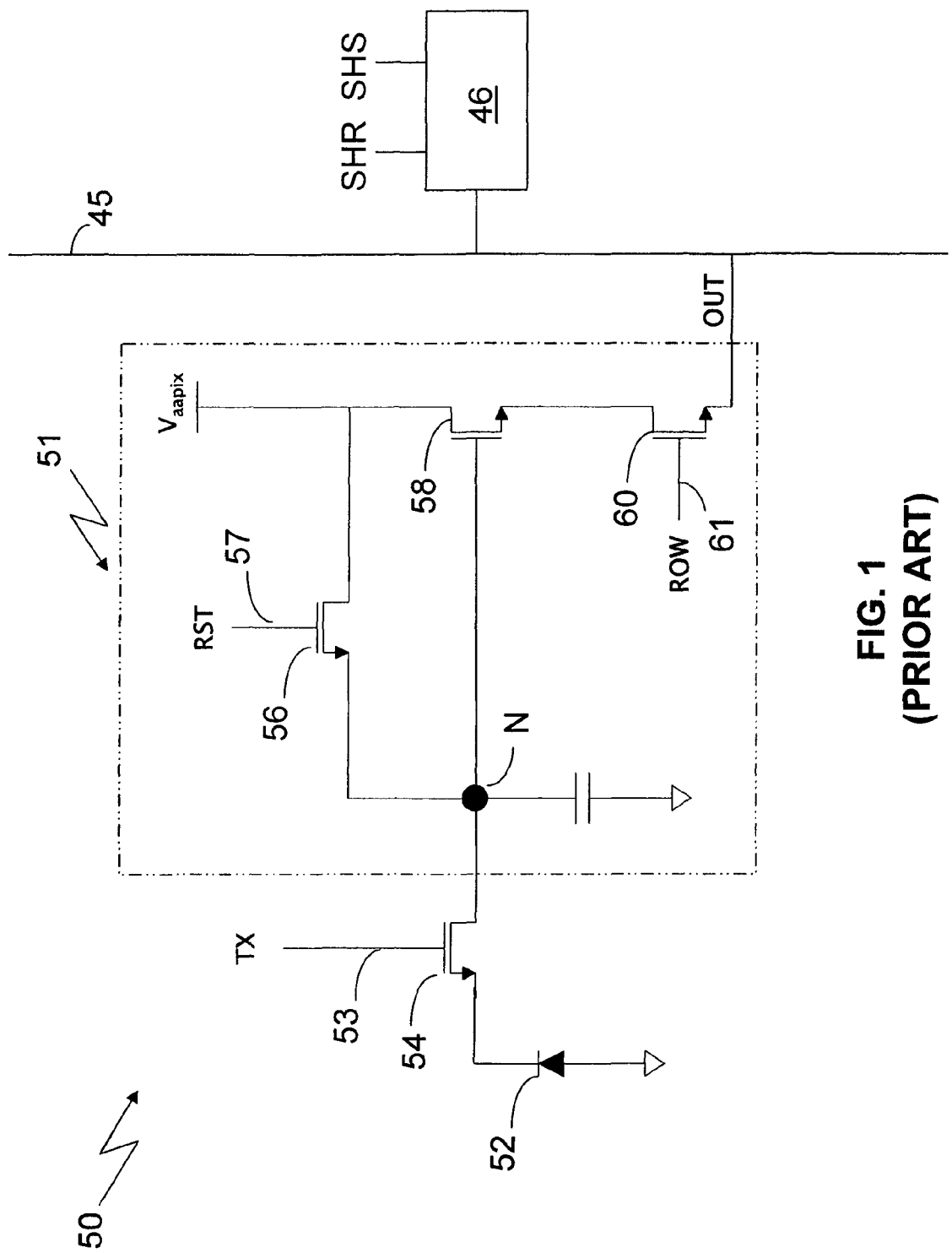
FIG. 1 illustrates a four-transistor pixel for use in an array of an imaging device.

A pixel array is formed by a plurality of FIG. 2 pixels which are arranged in rows and columns. Pixel 250 is identical to pixel 50 (FIG. 1), except that the reset select line 257 for a pixel in a current row is combined with a row select line for a pixel 250 in a different row i (where i is any positive or negative non-zero integer). Under such a configuration, reset select line 257 carries a signal that is a reset select signal $RST_n$ for the current pixel 250 (i.e., row n) as well as a row select signal $ROW_{n+i}$ for a pixel in a different row i. Moreover, the row select line 261 is combined with a reset select line for a pixel 250 in a following row n+j (where j is any positive or negative non-zero integer). Under such a configuration, the row select line 261 carries a signal that is a row select signal $ROW_n$ for the current pixel 250 (i.e., row n) as well as a reset select signal $RST_{n+j}$ for a pixel in a different row. Furthermore, i and j cannot be equal to each other because the pixels sharing lines cannot be in the same row. For example, i can be equal to 2 and j can be equal to −2.

Figure 3:
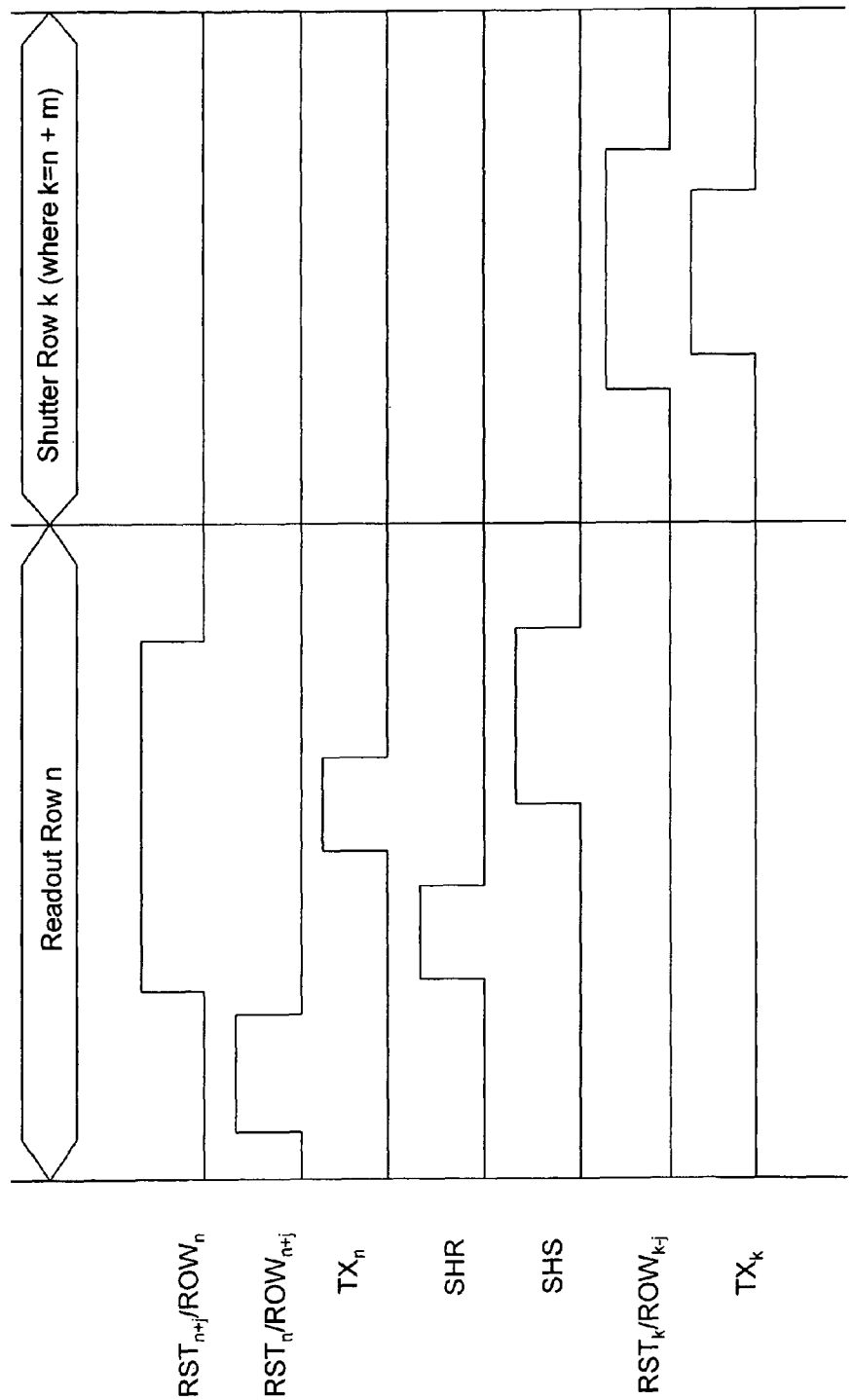
FIG. 3 is a timing diagram depicting an example of a method for operating a pixel array constructed according to an embodiment described herein.

FIG. 3 shows one example of a rolling shutter readout timing for operating a pixel 250 shown in FIG. 2. Specifically, FIG. 3 shows a readout timing for a current row n and a shutter timing which begins an exposure period for a photosensor for a subsequent row k, where k=n+m. In a preferred embodiment, the readout and shuttering of FIG. 3 is essentially linear, though such linearity is not necessary. While FIG. 3 shows a rolling shutter, this embodiment is not limited to a rolling shutter and can be used with other shuttering methods such as a global shutter.

First, in FIG. 3, the reset select signal $RST_n$ for the current pixel 250 is activated. Next, once the reset select signal $RST_n$ for the current pixel 250 becomes inactive, the row select signal $ROW_n$ of the current pixel 250 is activated to allow the pixel reset signal $V_{rst}$ to be output by the source follower transistor 58 through row select transistor 60 to column line 45 which routes the signal to sample and hold circuit 46, which samples and holds the new signal $V_{rst}$ when the reset sample and hold select signal SHR is activated.

Next, still referring to FIG. 3, when the reset select signal $RST_n$ for the current pixel 250 becomes inactive, the current pixel 250, which has been integrating charge in photosensor 52 after a prior pixel read, transfers the integrated photoelectric charge to the floating diffusion region N when the transfer select signal $TX_n$ of the current pixel 250 is activated. This photoelectric charge is then transferred as the photo signal $V_{sig}$ at the output of the source follower transistor 58 on through row select transistor 60 to column line 45. Column line 45 routes the signal to the sample and hold circuit 46, which samples and holds the photo signal $V_{sig}$ when the pixel signal sample and hold select signal SHS is activated, because the row select signal $ROW_n$ of the current pixel 250 is active.

Next, still referring to FIG. 3, a pixel in a subsequent row k is reset by an activation of the $RST_k$ signal and the $TX_k$ signal during the time the shutter points to row k. While both lines $RST_k, TX_k$ are active, the photosensors of the pixels in row k are reset. After $RST_k$ becomes inactive, the pixels in row k begin to integrate. At some time after integration is complete, the pixels in row k will be readout in the same manner as pixel 250 in row n in FIG. 3. While activating a select line for the current pixel also activates select lines in other pixels, the signals sent to other pixels are inconsequential because operations of consequence are performed on a pixel only when that pixel is being read out.

Figure 4A:
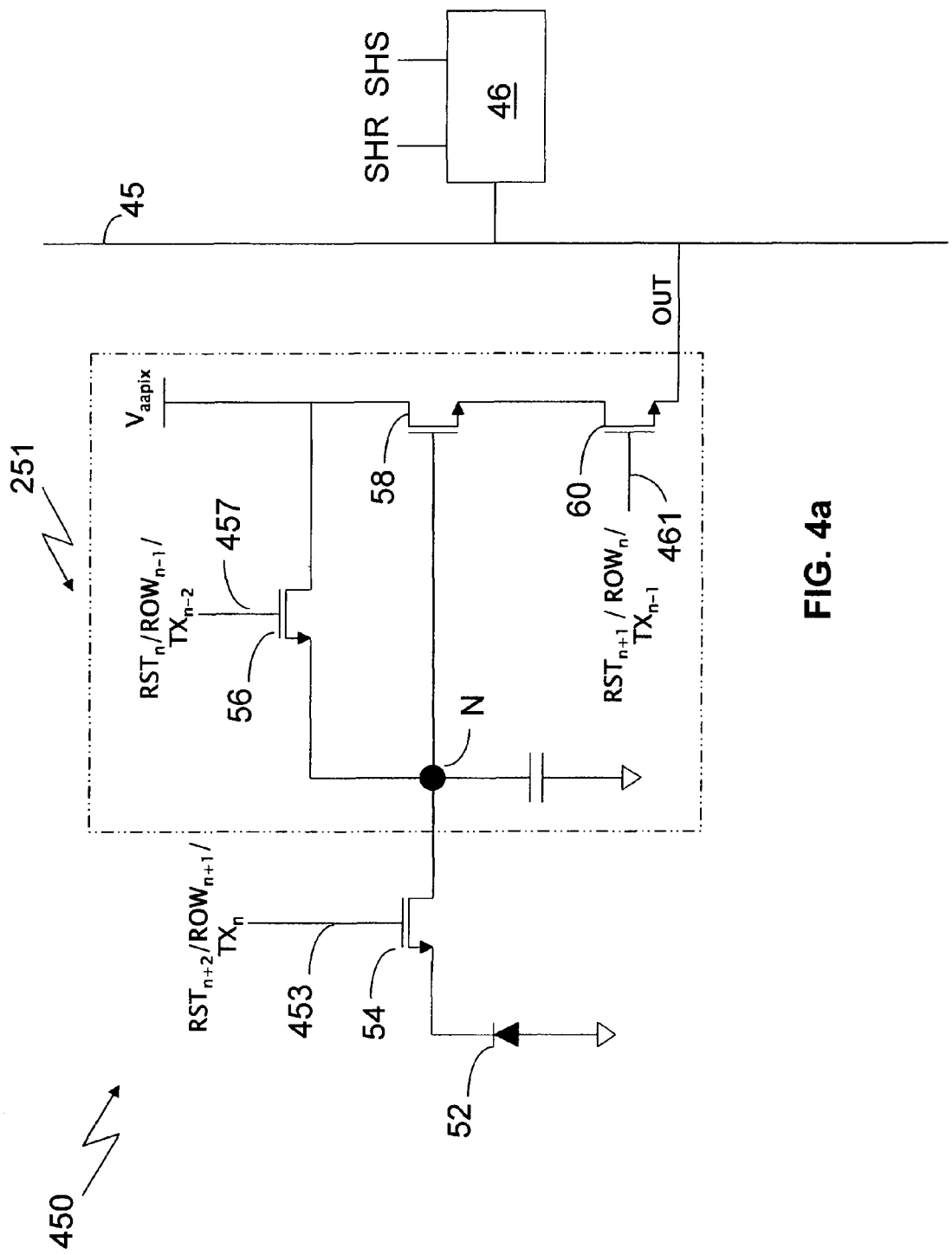
FIG. 4a is a diagram of a four-transistor pixel according to an embodiment described herein.

FIG. 4a illustrates an example of a pixel 450 constructed in accordance with another embodiment. Pixel 450 is similar to pixel 250 (FIG. 2) except that the combined reset and row select lines in pixel 450 are also combined with the transfer select line. Specifically, the reset select line 457 for a pixel 450 in a current row is combined with a row select line for a pixel 450 in a previous row n−1 and a transfer select line for a pixel 450 in a twice previous row n−2. Under such a configuration, reset select line 457 carries a signal that is a reset select signal $RST_n$ for the current pixel 450 (i.e., row n) as well as a row select signal $ROW_{n-1}$ for a pixel in a previous row and a transfer select signal $TX_{n-2}$ for a pixel in a twice previous row. Moreover, the row select line 461 is combined with a reset select line for a pixel 450 in a following row n+1 and a transfer select line for a pixel 450 in a previous row n−1. Under such a configuration, the row select line 461 carries a signal that is a row select signal $ROW_n$ for the current pixel 450 (i.e., row n) as well as a reset select signal $RST_{n+1}$ for a pixel in a following row and a transfer select signal $TX_{n-1}$ for a pixel in a previous row. Furthermore, the transfer select line 453 is combined with a row select line for a pixel 450 in a following row n+1 and a reset select line in a pixel in a twice following row n+2. Under such a configuration, the transfer select line 453 carries a signal that is a transfer select signal $TX_n$ for the current pixel 450 (i.e., row n) as well as a row select signal $ROW_{n+1}$ for a pixel in a following row and a reset select signal $RST_{n+2}$ for a pixel in a twice following row.

Figure 4B:
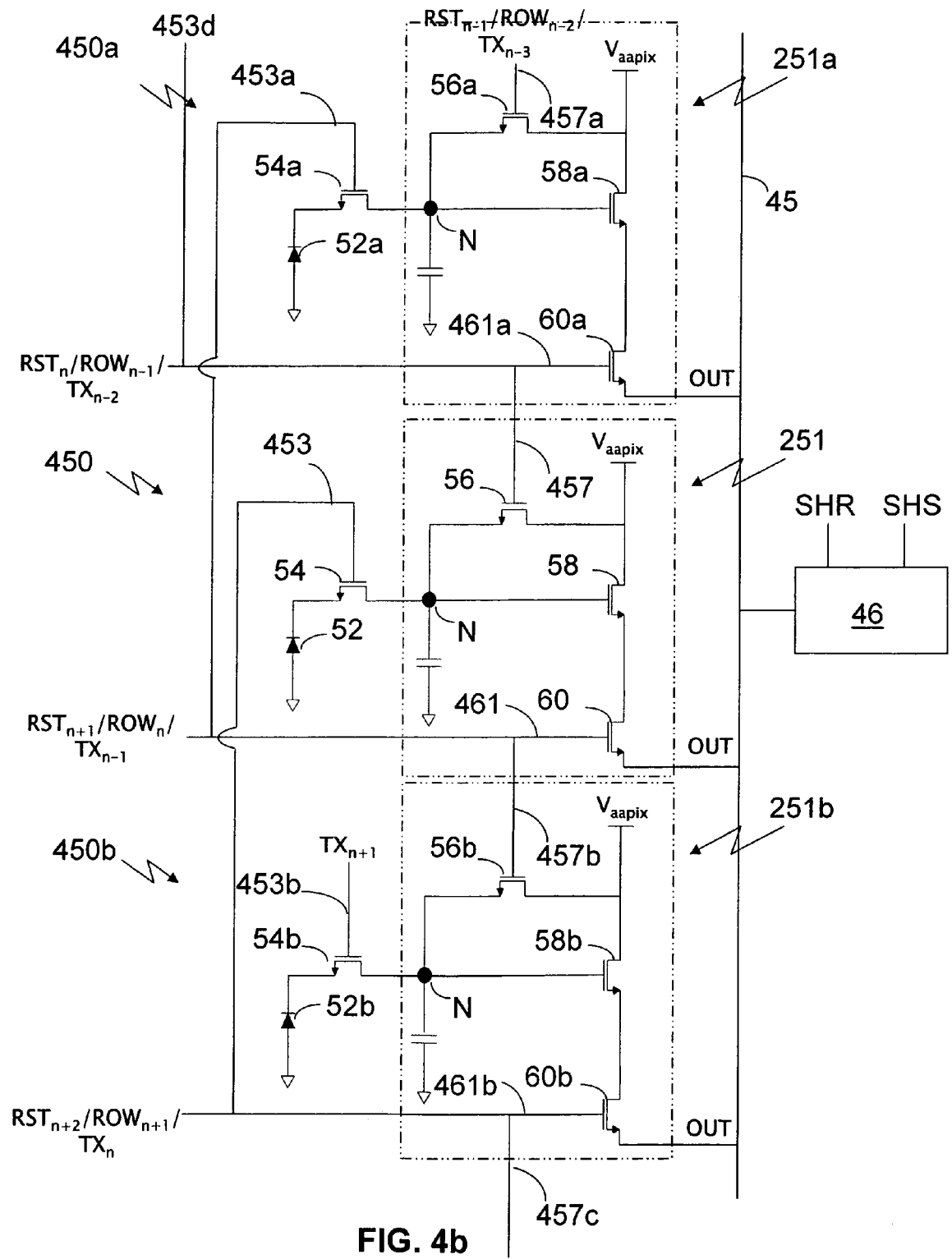
FIG. 4b is a diagram of a portion of a pixel array according to an embodiment described herein.

FIG. 4b is an expanded view of the pixel 450 of FIG. 4a, showing the vertically adjacent pixel 450a in a previous row, and the vertically adjacent pixel 450b in a following row. While the embodiments here show adjacent pixels, it should be understood that the pixels need not be vertically adjacent but can be vertically separated by any number of pixels. Reset select line 457 need not carry a row select signal $ROW_{n-1}$ for a pixel in a previous row and a transfer select signal $TX_{n-2}$ for a pixel in a twice previous row, but can carry a row select signal $ROW_{n+r}$ and transfer select signal $TX_{n+s}$ for pixels in any rows r and s (where r and s are not equal and are any positive or negative non-zero integers). Likewise, row select line 461 need not carry a reset select signal $RST_{n+1}$ for a pixel in a following row and a transfer select signal $TX_{n-1}$ for a pixel in a previous row, but can carry a reset select signal $RST_{n+t}$ and transfer select signal $TX_{n+u}$ for pixels in any rows t and u (where t and u are not equal and are any positive or negative non-zero integers). Furthermore, transfer select line 453 need not carry a row select signal $ROW_{n+1}$ for a pixel in a following row and a reset select signal $RST_{n+2}$ for a pixel in a twice following row, but can carry a row select signal $ROW_{n+v}$ and reset select signal $RST_{n+w}$ for pixels in any rows v and w (where v and w are not equal and are any positive or negative non-zero integers).

As shown in FIG. 4b, the combined reset select line 457 of the current pixel 450, row select line 461a of the previous pixel 450a and transfer select line 453d of the (unshown) twice previous pixel 450d carries the reset select signal $RST_n$ of the current pixel 450, the row select signal $ROW_{n-1}$ of the previous pixel 450a and the transfer select signal $TX_{n-2}$ of the (unshown) twice previous pixel 450d. The combined row select line 461 of the current pixel 450, reset select line 457b of the following pixel 450b and transfer select line 453a of the previous pixel 450a carries the row select signal $ROW_n$ of the current pixel 450, the reset select signal $RST_{n+1}$ of the following pixel 450b and the transfer select signal $TX_{n-1}$ of the previous pixel 450a. Moreover, the combined transfer select line 453 of the current pixel 450, row select line 461b of the following pixel 450b, and reset select line 457c of the (unshown) twice following pixel 450c carries the transfer select signal $TX_n$ of the current pixel 450, the row select signal $ROW_{n+1}$ of the following pixel 450b and the reset select signal $RST_{n+2}$ of the (unshown) twice following pixel 450c. Combining these lines in such a manner substantially reduces the metal lines required in an imaging device thus increasing the area available for the photosensor.

Figure 4C:
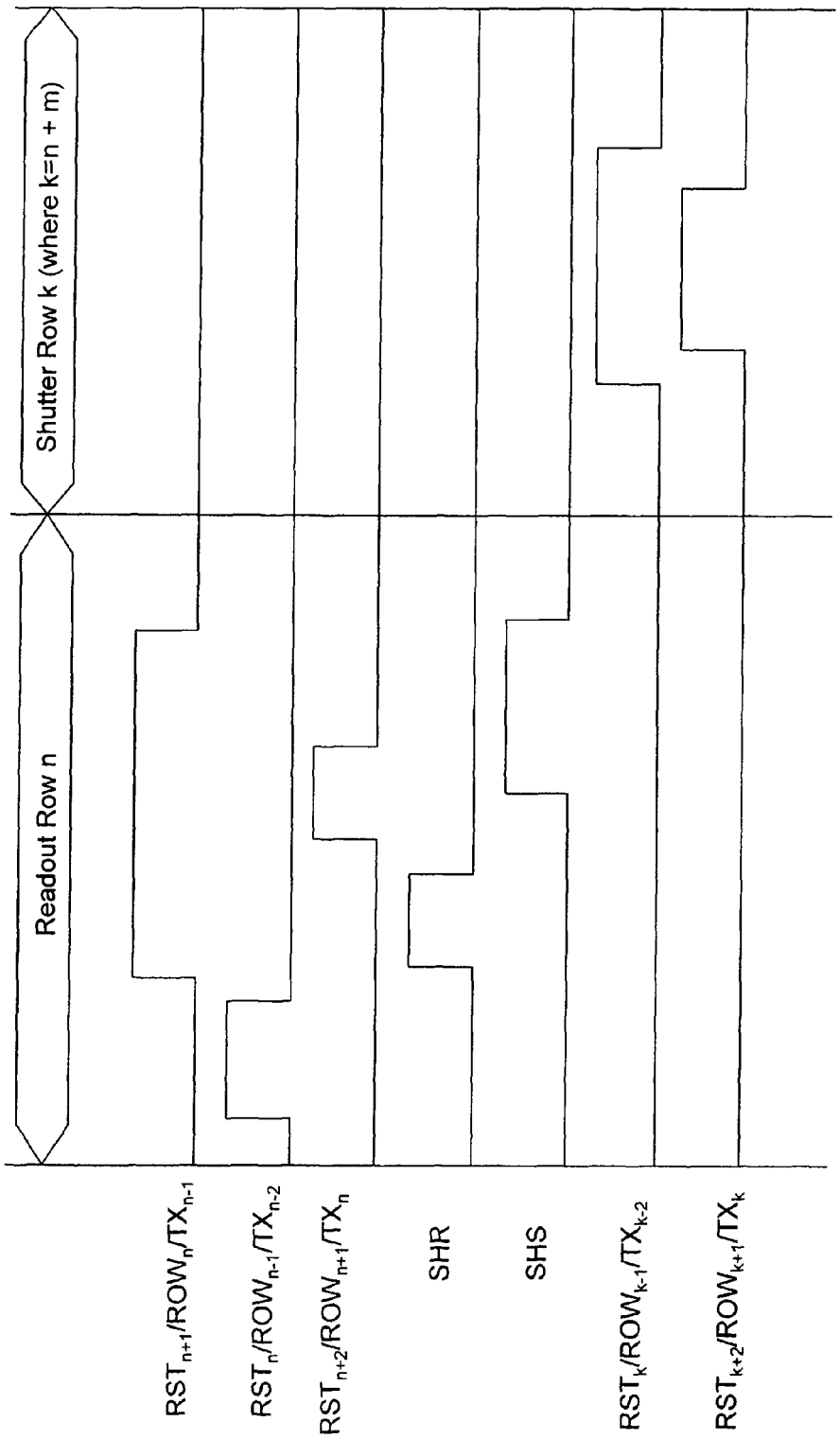
FIG. 4c is a timing diagram depicting an example of a method for operating a pixel array constructed according to an embodiment described herein.

FIG. 4c shows one example of a rolling shutter readout timing for operating a pixel 450 shown in FIGS. 4a and 4b. The readout timing in FIG. 4c is similar to the readout timing in FIG. 3 except that the readout timing in FIG. 4c is for pixel 450. FIG. 4c shows a readout timing for a pixel 450 in a current row n and a shutter timing which begins an exposure period for a photosensor for a subsequent row k, where k=n+m. In a desired embodiment, the readout and shuttering of FIG. 3 is essentially linear, though such linearity is not necessary. While FIG. 4c shows a rolling shutter, this embodiment is not limited to a rolling shutter and can be used with other shuttering methods such as a global shutter.

First, in FIG. 4c, the reset select signal $RST_n$ for the current pixel 450 is activated. Next, once the reset select signal $RST_n$ for the current pixel 450 becomes inactive, the row select signal $ROW_n$ of the current pixel 450 is activated to allow the pixel reset signal $V_{rst}$ to be output by the source follower transistor 58 through row select transistor 60 to column line 45 which routes the signal to sample and hold circuit 46 which samples and holds the new signal $V_{rst}$ when the reset sample and hold select signal SHR is activated.

Next, still referring to FIG. 4c, when the reset select signal $RST_n$ for the current pixel 450 becomes inactive, the current pixel 450, which has been integrating charge in photosensor 52 after a prior pixel read, transfers the integrated photoelectric charge to the floating diffusion region N when the transfer select signal $TX_n$ of the current pixel 450 is activated. This photoelectric charge is then transferred as the photo signal $V_{sig}$ at the output of the source follower transistor 58 on through row select transistor 60 to column line 45. Column line 45 routes the signal to the sample and hold circuit 46 which samples and holds the photo signal $V_{sig}$ when the pixel signal sample and hold select signal SHS is activated, because the row select signal $ROW_n$ of the current pixel 450 is active.

Next, still referring to FIG. 4c, a pixel in a subsequent row k is reset by an activation of the $RST_k$ signal and the $TX_k$ signal during the time the shutter points to a row k. While both lines $RST_k$, $TX_k$ are active, the photosensors of the pixels in row k are reset. After $RST_k$ becomes inactive, the pixels in row k begin to integrate. At some time after integration is complete, the pixels in row k will be readout in the same manner as pixel 450 in row n in FIG. 4c. While activating a select line for the current pixel also activates select lines in other pixels, the signals sent to other pixels are inconsequential because operations of consequence are performed on a pixel only when that pixel is being read.

Figure 5A:
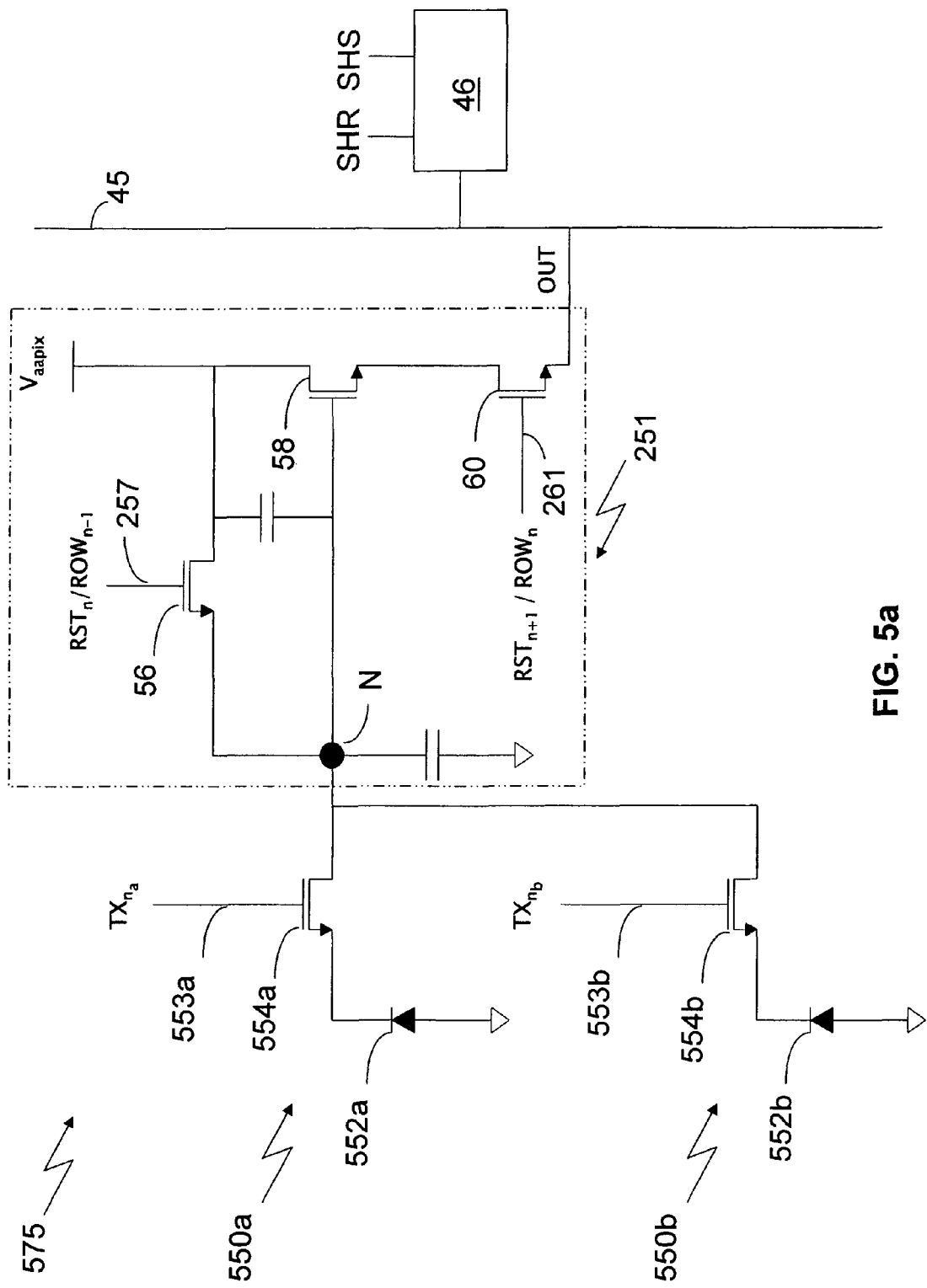
FIG. 5a is a diagram of a two-way shared pixel circuit according to an embodiment described herein.

FIG. 5a shows another embodiment similar to FIG. 2, however the readout circuit 251 is shared by two pixels 550a, 550b in a two-way shared pixel circuit 575. Pixels 550a, 550b contain photosensors 552a, 552b and transfer transistors 554a, 554b and share readout circuit 251.

While a pixel array includes rows and columns of pixels, a pixel array containing two-way shared pixel circuits 575 also includes rows of readout circuits such that each readout circuit row corresponds to two pixel rows. In FIGS. 5a-8b, references to rows (n−1, n, n+1) are to readout circuit rows, not pixel rows as in FIGS. 2-4c. Quantum efficiency is further increased in two-way shared pixel circuit 575 because two pixels 550a, 550b share a readout circuit 251.

Two-way shared pixel circuit 575 has two pixels 550a, 550b sharing a readout circuit 251. Transfer transistors 554a, 554b switchably couple photosensors 552a, 552b to the floating diffusion region N. The row select lines 261 and reset select lines 257 are combined with lines of other two-way shared pixel circuits 575 in a similar manner as shown in FIG. 2. That is, reset select line 257 of the current two-way shared pixel circuit 575 is combined with the row select line of a two-way shared pixel circuit in a previous readout circuit row n−1 and row select line 261 of the current two-way pixel shared circuit 575 is combined with the reset select line of a two-way shared pixel circuit in a following readout circuit row n+1. Also, each readout circuit row has two transfer select lines, 553a, 553b, which carry transfer select signals $TX_{na}$, $TX_{nb}$, respectively.

While FIG. 5a shows vertically adjacent readout circuit rows (n−1, n, n+1), the reset and row select lines may also be combined with the reset and row select lines of any readout circuits in previous or following readout circuit rows that are not adjacent. Readout circuits sharing select lines, however, may not be in the same readout circuit row.

Figure 5B:
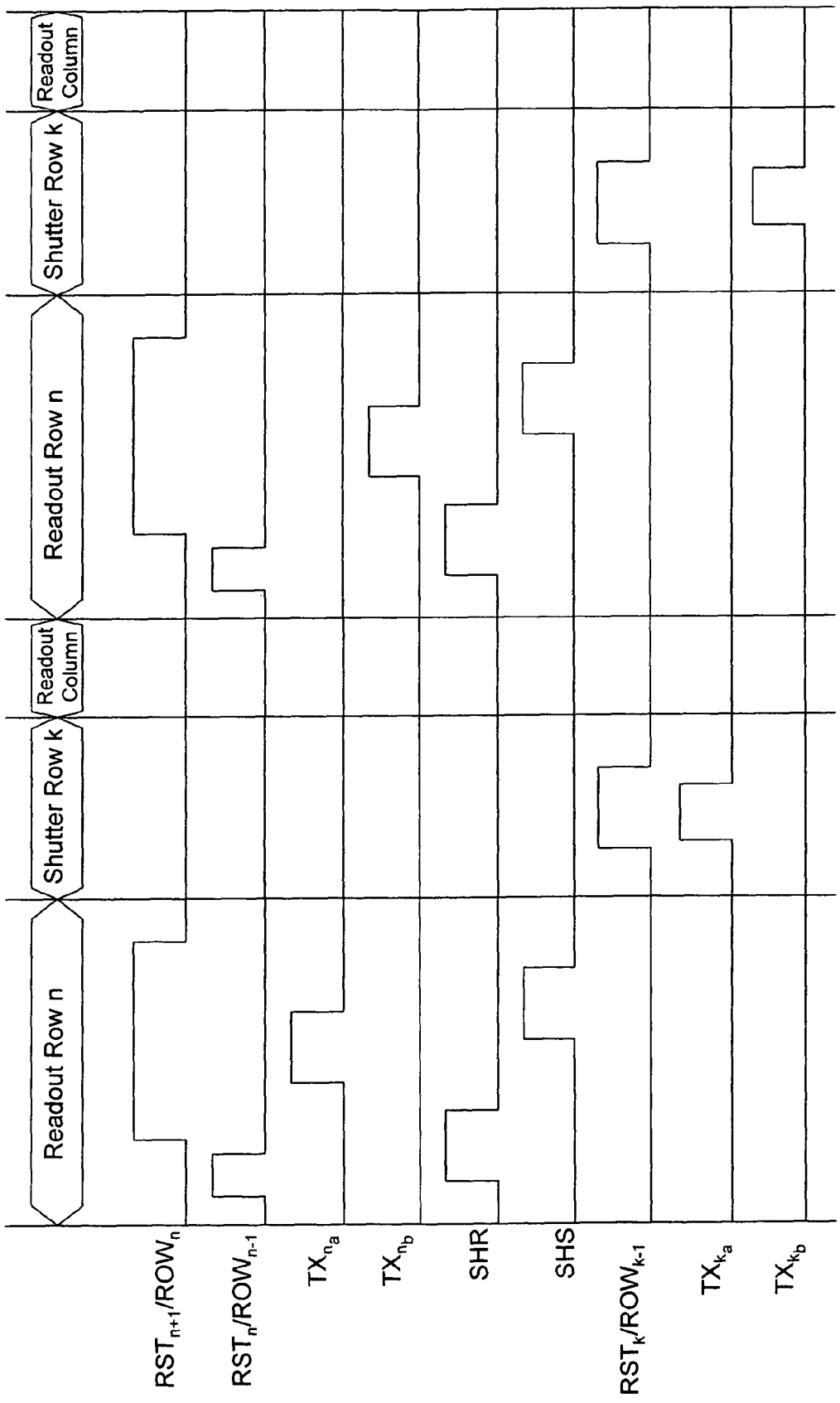
FIG. 5b is a timing diagram depicting an example of a method for operating a pixel array constructed according to an embodiment described herein.

FIG. 5b shows one example of a readout timing for operating the two-way shared pixel circuit 575 shown in FIG. 5a. Specifically, FIG. 5b shows a readout timing for a current readout circuit row n and a shutter timing which begins an exposure period for photosensors sharing a subsequent readout circuit row k, where k=n+m. The readout timing in FIG. 5b for two-way shared pixel circuit 575 is substantially the same as the readout timing in FIGS. 4a and 4b for pixel 250, except that the readout timing is duplicated because of the sharing of readout circuit 251 by two pixels 550a, 550b. For example, when charge is being transferred from pixel 552a to the floating diffusion region, $TX_{na}$ is active, and when charge is being transferred from pixel 552b to the floating diffusion region, $TX_{nb}$ is active.

In a desired embodiment, the readout and shuttering of FIG. 5b is essentially linear, though such linearity is not necessary. First, pixel 550a in row n is readout to a sample and hold circuit. Next, a pixel 550a or 550b in a subsequent row k is shuttered. Next, the column sample and hold circuit 46 is read out. Next, pixel 550b in row n is read and then pixel 550a or 550b in row k is shuttered (whichever pixel was not previously shuttered). Lastly, the column sample and hold circuit 46 is again read out. While the pixel associated with transfer select line 553a are read out first in the readout timing in FIG. 5b, it is to be understood that pixels associated with either 553a or 553b can be read out first. Likewise, shuttering of pixels can occur in any order and regardless of which pixels are read out (e.g., pixel associated with 553a is read out, pixel associated with 553b in row k is shuttered). Furthermore, while activating a select line for the current two-way shared pixel circuit also activates select lines in other two-way shared pixel circuits, the signals sent to other two-way shared pixel circuits are inconsequential because operations of consequence are performed on a two-way shared pixel circuit only when a pixel in that two-way shared pixel circuit is being read.

Figure 6A:
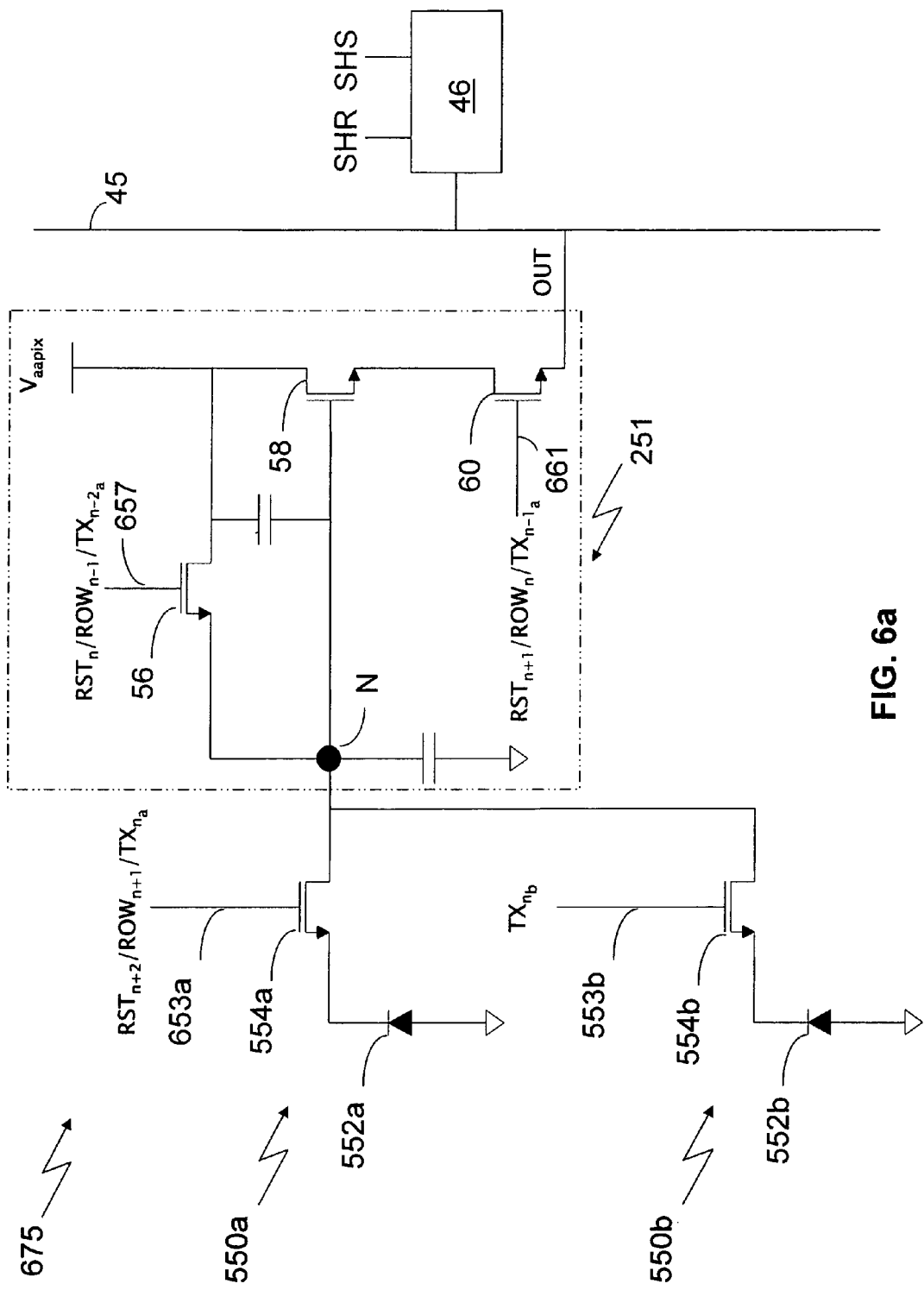
FIG. 6a is a diagram of a two-way shared pixel circuit according to an embodiment described herein.

FIG. 6a shows another embodiment of a two-way shared pixel circuit 675 similar to two-way shared pixel circuit 575 in FIG. 5a, however a transfer select line 653a is combined with reset and row select lines of different pixels in a manner similar to that shown in FIGS. 4a and 4b. As a result, quantum efficiency is further increased in two-way shared pixel circuit 675. While FIG. 6a shows transfer select line 653a combined with the reset and row select lines of other two-way shared pixel circuits, transfer select line 653b may be combined in place of transfer select line 653a.

Two-way shared pixel circuit 675 has two pixels 550a, 550b sharing a readout circuit 251. Transfer transistors 554a, 554b switchably couple photosensors 552a, 552b to the floating diffusion region N. The row select lines 661, reset select lines 657 and transfer select lines 653a are combined with lines of other two-way shared pixel circuits 675 in a similar manner as that shown in FIGS. 4a and 4b. That is, reset select line 657 of the current two-way shared pixel circuit 675 is combined with the row select line of a two-way shared pixel circuit in a previous readout circuit row n−1 and the transfer select line of a two-way shared pixel circuit in a twice previous readout circuit row n−2. Also, row select line 661 of the current two-way shared pixel circuit 675 is combined with the reset select line of a two-way shared pixel in a following row n+1 and a transfer select line of a two-way shared pixel in a previous row n−1. Moreover, transfer select line 653a of the current two-way shared pixel circuit 675 is combined with the row select line in a two-way shared pixel circuit 675 in a following row n+1 and a reset select line in a two-way shared pixel circuit in a twice following row n+2. Also, each readout circuit row has two transfer select lines, 553a, 553b, which carry transfer select signals $TX_{na}$, $TX_{nb}$, respectively.

While FIG. 6a shows vertically adjacent readout circuit rows (n−1, n, n+1), the reset, row and transfer select lines may also be combined with the reset, row and transfer select lines of any two-way shared pixel circuits in previous or following readout circuit rows that are not adjacent. Two-way shared pixel circuits sharing select lines, however, may not be in the same readout circuit row.

Figure 6B:
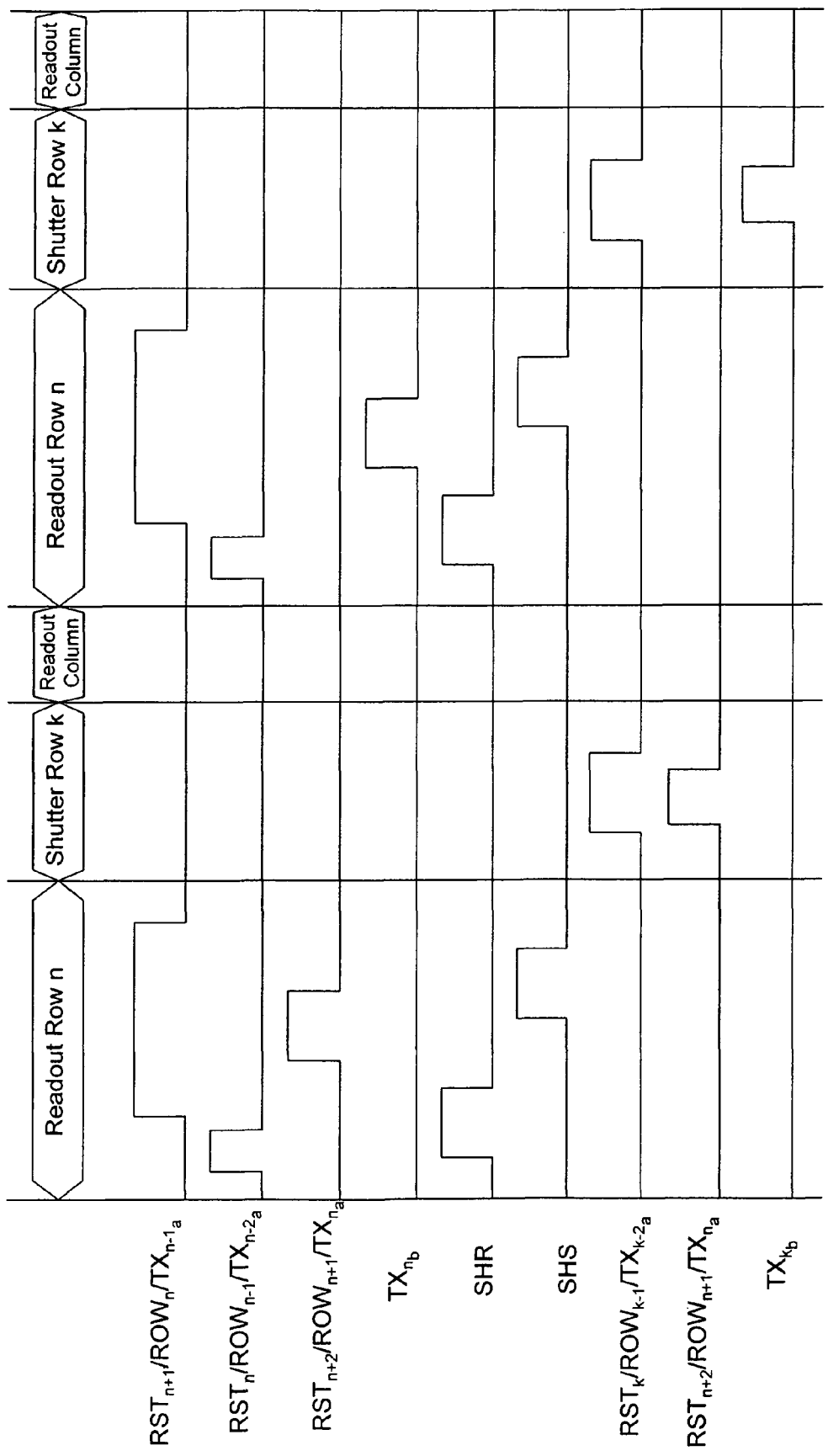
FIG. 6b is a timing diagram depicting an example of a method for operating a pixel array constructed according to an embodiment described herein.

FIG. 6b shows one example of a readout timing for operating the two-way shared pixel circuit 675 shown in FIG. 6a. Specifically, FIG. 6b shows a readout timing for a current readout circuit row n and a shutter timing which begins an exposure period for photosensors sharing a subsequent readout circuit row k, where k=n+m. The readout timing in FIG. 6b for two-way shared pixel circuit 675 is substantially the same as the readout timing in FIG. 5b for two-way shared pixel circuit 575, except that activating transfer select signal $TX_{na}$ for a two-way shared pixel circuit 675 in the current readout circuit row also activates a row select signal $ROW_{n+1}$ for a two-way shared pixel circuit in a following row n+1 and a reset select signal $RST_{n+2}$ for a two-way shared pixel circuit in a twice following row n+2. Also, activating row select signal $ROW_n$ for a two-way shared pixel circuit 675 in the current readout circuit row also activates a reset select signal $RST_{n−1}$ for a two-way shared pixel circuit in the previous row n−1 and a transfer select signal $TX_{n−1}a$ for a two-way shared pixel circuit in a following row n+1. Moreover, activating the reset select signal $RST_n$ for a two-way shared pixel circuit 675 in the current readout circuit row also activates the row select signal $ROW_{n−1}$ in a two-way shared pixel circuit in a previous row n−1 and a transfer select signal $TX_{n−2}$ in a two-way shared pixel circuit in a twice previous row n−2.

Like the readout timing in FIG. 5b, the readout timing of FIG. 6b is essentially linear in a desired embodiment, but need not be linear. First, pixel 550a in row n is readout to a sample and hold circuit. Next, pixel 550a or 550b in a subsequent row k is shuttered. Next, the column sample and hold circuit 46 is read out. Pixel 550b in row n is read and then pixel 550a or 550b in row k is shuttered (whichever was not previously shuttered). Lastly, the column sample and hold circuit 46 is again read out. While the pixel associated with transfer select line 653a is read out first in the readout timing in FIG. 6b, it is to be understood that pixels associated with either line 653a or 553b can be read out first. Likewise, shuttering of pixels can occur in any order and regardless of which pixels are read out (e.g., pixel associated with 653a is read out, pixel associated with 553b in row k is shuttered). Furthermore, while activating a select line for the current two-way shared pixel circuit also activates select lines in other two-way shared pixel circuits, the signals sent to other two-way shared pixel circuits are inconsequential because operations of consequence are performed on a two-way shared pixel circuit only when a pixel in that two-way shared pixel circuit is being read out.

Figure 7:
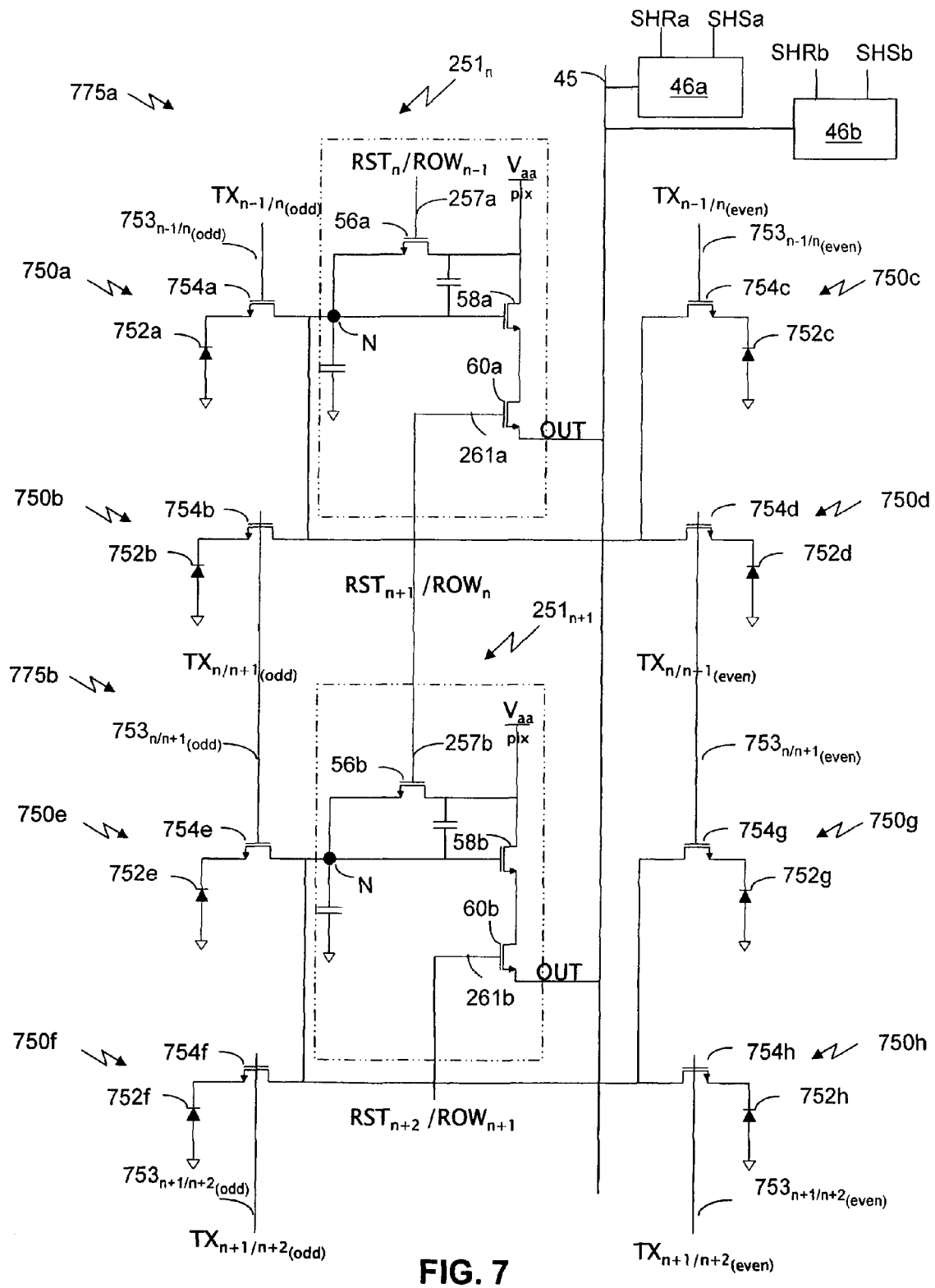
FIG. 7 is a diagram of a portion of a pixel array depicting four-way shared pixel circuits according to an embodiment described herein.

FIG. 7 shows another embodiment similar to FIG. 5a, however, the readout circuit $251_n$ is shared by four pixels 750a, 750b, 750c, 750d in a four-way shared pixel circuit 775 and transfer select lines $753_{n/n+1(odd)}$, $753_{n/n+1(even)}$ are shared by adjacent four-way shared pixel circuits 775a, 775b. FIG. 7 shows two four-way shared pixel circuits 775a, 775b to illustrate the relationship between four-way shared pixel circuits 775a, 775b in a pixel array. Because four-way shared pixel circuits 775a and 775b are internally identical, only four-way shared pixel circuit 775a will be described. Pixels 750a, 750b, 750c, 750d share readout circuit $251_n$ and contain photosensors 752a, 752b, 752c, 752d and transfer transistors 754a, 754b, 754c, 754d.

While a pixel array includes rows and columns of pixels, a pixel array containing four-way shared pixel circuits 775a also includes rows and columns of readout circuits such that a readout circuit row and column correspond to two pixels rows and two pixel columns respectively. Quantum efficiency is increased in four-way shared pixel circuit 775a because four pixels 750a, 750b, 750c, 750d share a readout circuit $251_n$ and two pixel columns share one column line 45. Quantum efficiency is further increased in four-way shared pixel circuit 775a because transfer select lines are shared with vertically adjacent four-way shared pixel circuits.

Four-way shared pixel circuit 775a has four pixels 750a, 750b, 750c, 750d sharing a readout circuit $251_n$. Transfer transistors 754a, 754b, 754c, 754d switchably couple photosensors 752a, 752b, 752c, 752d to the floating diffusion region N. The row select lines 261a and reset select lines 257a are combined with lines of other four-way shared pixel circuits 775 in the same manner as shown in FIG. 5a. That is, reset select line 257a of the current four-way shared pixel circuit 775a is combined with the row select line of a four-way shared pixel circuit in a previous readout circuit row and row select line 261a of the current four-way shared pixel circuit 775a is combined with the reset select line 257b of four-way shared pixel circuit 775b in a following readout circuit row.

The four-way shared pixel circuit 775a shown in the embodiment of FIG. 7 has four transfer select lines, $753_{n-1/n(odd)}$, $753_{n/n+1(odd)}$, $753_{n-1/n(even)}$, $753_{n/n+1(even)}$, which carry transfer select signals $TX_{n-1/n(odd)}$, $TX_{n/n+1(odd)}$, $TX_{n-1/n(odd)}$, $TX_{n-1/n(even)}$, $TX_{n/n+1(even)}$, respectively. As shown in FIG. 7, four-way shared pixel circuit 775a shares transfer select lines $753_{n/n+1(odd)}$, $753_{n/n+1(even)}$ with four-way shared pixel circuit 775b such that transfer select line $753_{n/n+1(odd)}$ is shared by transfer select transistors 754b, 754e and $753_{n/n+1(even)}$ is shared by transfer select transistors 754d, 754g.

While FIG. 7 shows vertically adjacent readout circuit rows (n−1, n, n+1), the reset and row select lines may also be combined with the reset and row select lines of any readout circuits in previous or following readout circuit rows that are not adjacent. Readout circuits sharing select lines, however, may not be in the same readout circuit row.

Furthermore, in one embodiment, a pixel array containing four-way shared pixel circuits 775 will have two sample and hold circuits 46a, 46b, which have inputs SHRa, SHSa and SHRb, SHSb respectively.

Figure 8A:
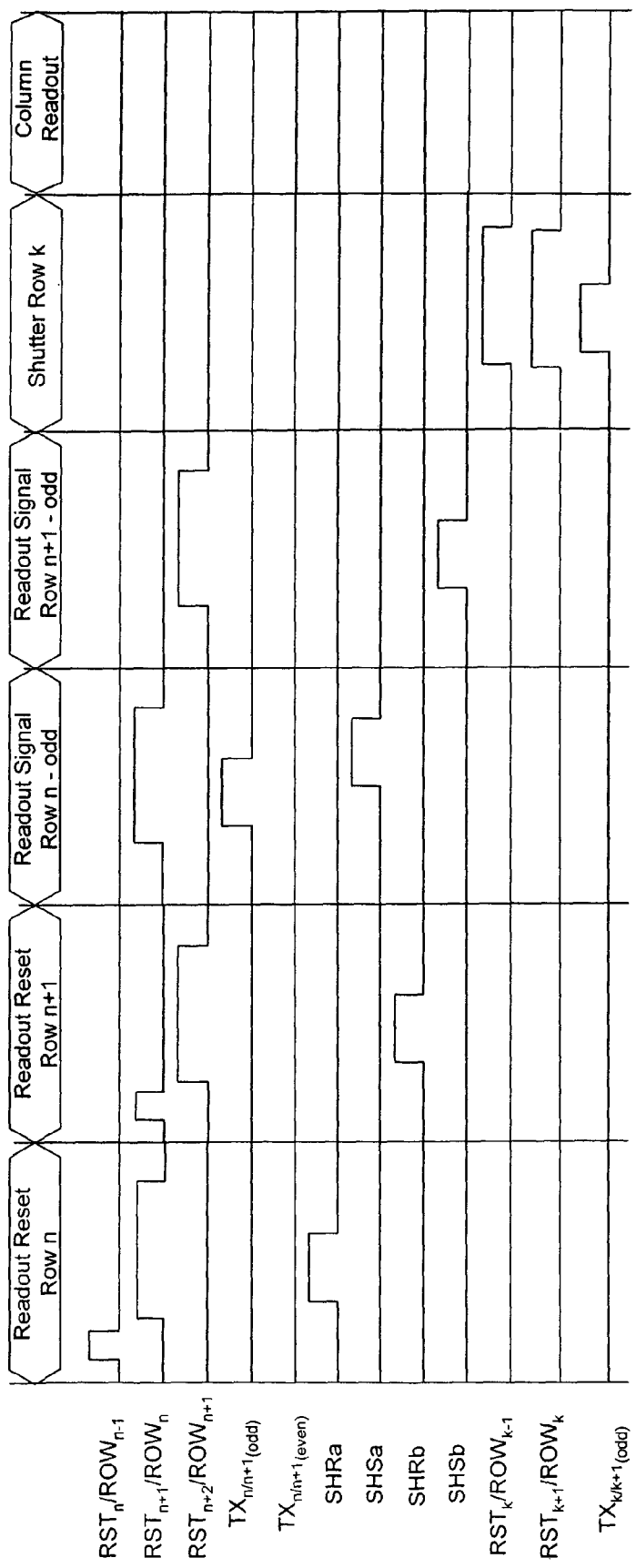
FIG. 8a is a timing diagram depicting an example of a method for operating a pixel array constructed according to an embodiment described herein.
Figure 8B:
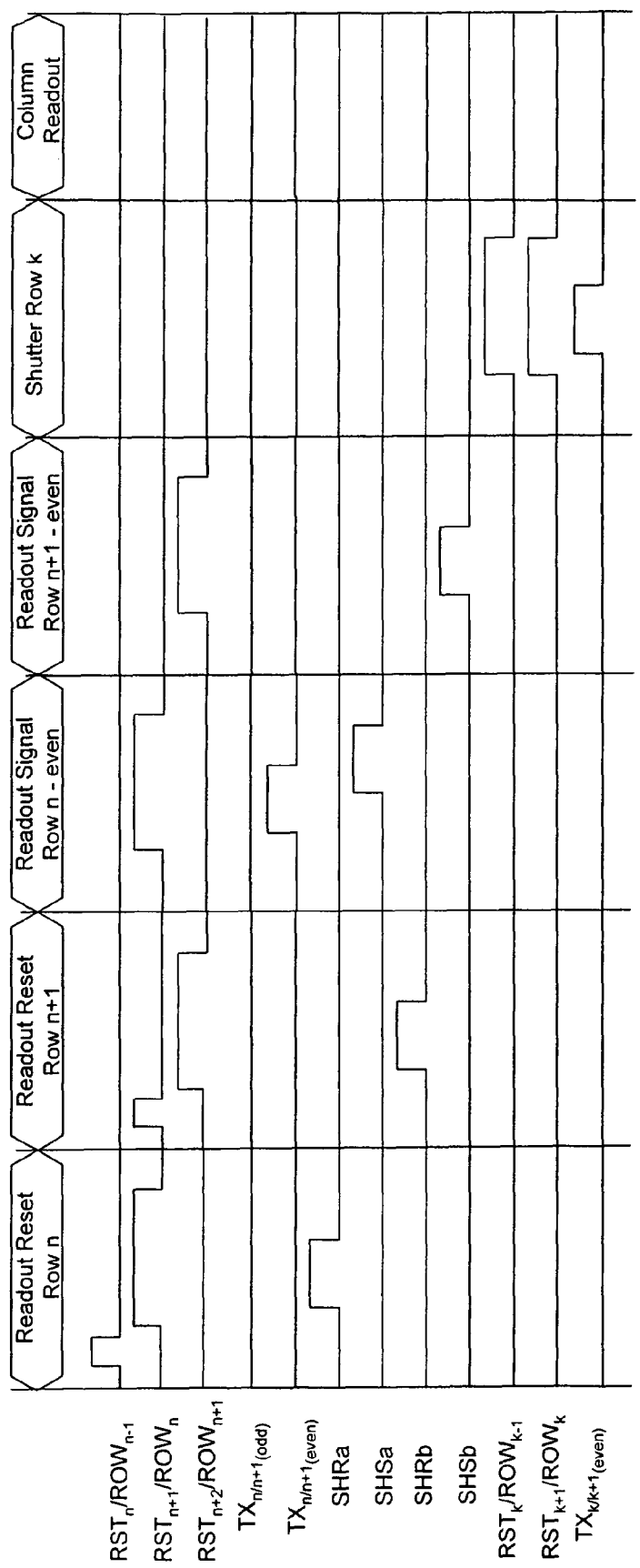
FIG. 8b is a timing diagram depicting an example of a method for operating a pixel array constructed according to an embodiment described herein.

FIGS. 8a and 8b show one example of a readout timing for operating the four-way shared pixel circuits 775a, 775b shown in FIG. 7. Specifically, FIG. 8a shows a readout timing for pixels sharing odd transfer select lines in a current readout circuit row n and a following readout row n+1 and a shutter timing which begins an exposure period for photosensors sharing a subsequent readout circuit row k, where k=n+m. Likewise, FIG. 8b shows a readout timing for pixels sharing even transfer select lines in a current readout circuit row n and a following readout row n+1 and a shutter timing which begins an exposure period for photosensors sharing a subsequent readout circuit row k, where k=n+m. The readout timing in FIGS. 8a and 8b for four-way shared pixel circuits 775a, 775b is similar to the readout timing in FIG. 5b for two-way shared pixel circuit 575, except that the readout timing is quadrupled because of the sharing of readout circuit 251 by four pixels 750a, 750b, 750c, 750d and the readout timing involves two readout circuits $251_n$, $251_{n+1}$ as opposed to the one readout circuit in FIG. 5b.

The readout timing of FIGS. 8a and 8b is essentially linear. FIGS. 8a, 8b show two timing diagrams such that the diagram in FIG. 8a precedes the diagram in FIG. 8b. FIG. 8a shows the readout timing for pixels 750b, 750e associated with an odd transfer select line $TX_{n/n+1(odd)}$, and FIG. 8b shows the readout timing for pixels 750d, 750g associated with an even transfer select line $TX_{n/n+1(even)}$.

Referring first to FIG. 8a, $RST_n$, $ROW_n$, and SHRa are activated to store pixel reset signal $V_{rst}$ from readout circuit $251_n$ in sample and hold circuit 46a. Next, $RST_{n+1}$, $ROW_{n+1}$ and SHRb are activated to store pixel reset signal $V_{rst}$ from readout circuit $251_{n+1}$ in sample and hold circuit 46b. Next, $ROW_n$, $TX_{n/n+1(odd)}$, and SHSa are activated to store the photo signal $V_{sig}$ from pixel 750b in the sample and hold circuit 46a. Next, $ROW_{n+1}$, $TX_{n/n+1(odd)}$ are activated to store the photo signal $V_{sig}$ from pixel 750e in the sample and hold circuit 46b. Next, two pixels are shuttered in a subsequent row k by activating $RST_k$, $RST_{k+1}$, and $TX_{k/k+1(odd)}$. Finally, the column sample and hold circuits 46a, 46b are read out.

The readout timing in FIG. 8b is then performed. The timing in FIG. 8b is essentially the same as the timing in FIG. 8a except that the even transfer select signal $TX_{n/n+1(even)}$ is activated to read out the photo signal from pixels 750d, 750g. While the odd pixels are read out first in the readout timing in FIGS. 8a, 8b, it is to be understood that either odd or even pixels can be read out first. Likewise, shuttering of even and odd pixels can occur in any order and regardless of which pixels are read out (e.g., odd pixels read out, even pixels shuttered).

Figure 9:
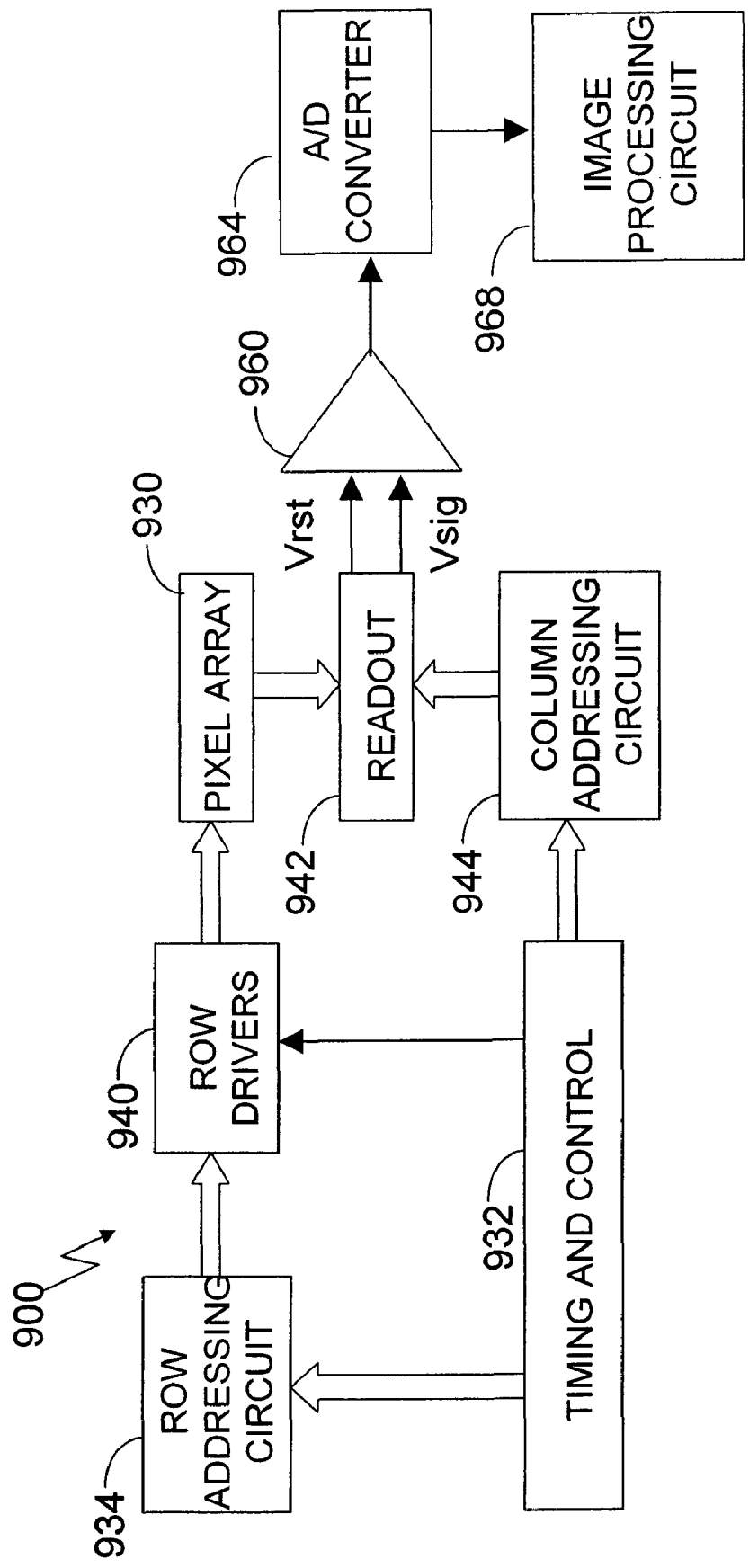
FIG. 9 is a block diagram of an imaging device according to an embodiment described herein.

FIG. 9 illustrates a block diagram of an example of a CMOS imager 900 having a pixel array 930 being constructed in accordance with one of the embodiments described above. Pixel array 930 comprises a plurality of pixels arranged in a predetermined number of columns and rows. The pixels of each row in array 900 are operated by row select lines, and the pixels of each column are selectively output by respective column select lines. A plurality of row and column lines are provided for the entire array 930. The row lines are selectively activated by a row driver 940 in response to row address circuit 934. The column select lines are selectively activated by a column addressing circuit 944. Thus, a row and column address is provided for each pixel. The pixel signals $V_{rst}$, $V_{sig}$ read out from each pixel are subtracted in differential amplifier 960 and are converted to digital signals by analog-to-digital converter 964 which supplies the digital signal to an image processing circuit which processes each pixel signal and forms an image which can be displayed, stored, or output.

Figure 10:
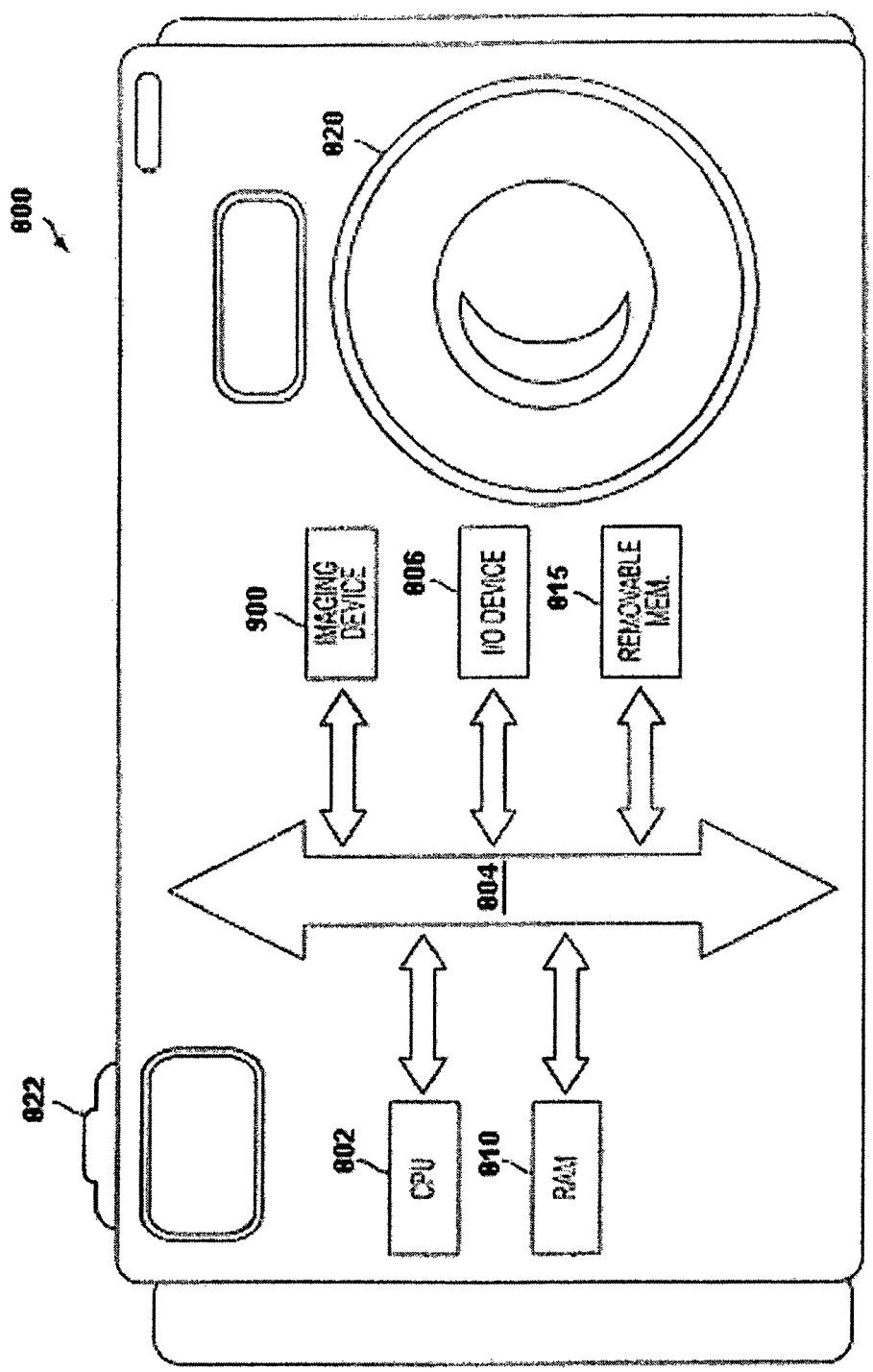
FIG. 10 is a block diagram of a processor system according to an embodiment described herein.

FIG. 10 shows a typical processor system 800 modified to include an imaging device 900 constructed and operated in accordance with an embodiment. The processor system 800 is a system having digital circuits that could include imaging devices. Without being limiting, such a system could include a computer system, camera system, scanner, machine vision, vehicle navigation, video phone, surveillance system, auto focus system, star tracker system, motion detection system, image stabilization system, or other image acquisition system.

System 800, for example a digital still or video camera system, generally comprises a central processing unit (CPU) 802, such as a control circuit or microprocessor for conducting camera functions, that communicates with one or more input/output (I/O) devices 806 over a bus 804. Imaging device 900 also communicates with the CPU 802 over the bus 804. The processor system 800 also includes random access memory (RAM) 810, and can include removable memory 815, such as flash memory, which also communicates with the CPU 802 over the bus 804. The imaging device 900 may be combined with the CPU processor with or without memory storage on a single integrated circuit or on a different chip than the CPU processor. In a camera system, a lens 820 is used to focus light onto the pixel array 930 of the imaging device 900 when a shutter release button 822 is pressed.

The above description and drawings are only to be considered illustrative of specific embodiments, which achieve the features and advantages described herein. Modification and substitutions to specific structures can be made. Accordingly, the invention is not to be considered as being limited by the foregoing description and drawings, but is only limited by the scope of the appended claims.

What is claimed as new and desired to be protected by Letters Patent of the United States is:

1. An imaging device, comprising:
   a pixel array having a plurality of pixels arranged in rows and columns, each pixel of the array comprising at least a photosensor;
   a plurality of pixel readout circuits arranged in rows and columns each associated with a plurality of pixels, said pixel readout circuit in a readout circuit row comprising:
   a storage node for receiving charges from a photosensor;
   a reset circuit responsive to a reset select signal for resetting said storage node;
   a circuit for providing an output signal based on changes stored at said storage node;
   a row select circuit responsive to a row select signal for selectively coupling said readout circuit to a column line;
   a transfer select transistor for switchably coupling the photosensor to the storage node; and
   a select line for commonly providing a reset select signal to said reset circuit, a row select signal to a row select circuit of a different readout circuit in a different readout circuit row, and a transfer select signal to a transfer select transistor in another readout circuit.

2. The imaging device of claim 1, further comprising:
   a plurality of transfer select circuits for selectively transferring charges from the photosensor to the storage node; and
   a plurality of transfer select lines, each transfer select line for supplying a transfer select signal to at least one transfer select circuit.

3. The imaging device of claim 1, wherein the readout circuit is coupled to receive charge from two pixels.

4. The imaging device of claim 1, wherein the readout circuit is coupled to receive charge from four pixels.

5. The imaging device of claim 1, wherein the different readout circuit row is vertically adjacent to the readout circuit row.

6. The imaging device of claim 1, wherein the different readout circuit row is a readout circuit row previous to the readout circuit row.

7. The imaging device of claim 1, wherein the different readout circuit row is a readout circuit row following the readout circuit row.

8. The imaging device of claim 1, wherein each pixel is one of a dual conversion gain pixel or a storage gate pixel.

9. The imaging device of claim 1, wherein the imaging device is a component of a processor system.

10. The imaging device of claim 1, wherein the imaging device is a component of a camera system.

11. An imaging device, comprising:
    a pixel array comprising a plurality of pixels arranged in rows and columns, at least one pixel in a first row of said array comprising:
    a photosensor;
    a floating diffusion region for storing a photoelectric charge supplied by the plurality of photosensors; a source follower transistor having a gate coupled to said floating diffusion region;
    a reset transistor for resetting the floating diffusion region, the reset transistor having a gate coupled to a first reset select line;
    a row select transistor for switchably coupling the source follower transistor to a column line, the row select transistor having a gate coupled to a second reset select line of a pixel in a second row; and
    a transfer select transistor for switchably coupling the photosensor to the floating diffusion region, the transfer select transistor having a gate coupled to a third reset select line of a pixel in a third row.

12. The imaging device of claim 11, wherein the first reset select line is coupled to a gate of a row select transistor of a fourth row.

13. The imaging device of claim 11, wherein the second and third rows are vertically adjacent rows of the first row.

14. The imaging device of claim 11, wherein the imaging device is a component of a processor system.

15. The imaging device of claim 11, wherein the imaging device is a component of a camera system.

16. A method of operating a pixel circuit, the method comprising:
    activating a first select line coupled to a first pixel in a first row to activate a reset transistor in the first pixel in the first row, to simultaneously activate a row select transistor in a second pixel in a second row, and to simultaneously activate a transfer transistor in a third pixel in a third row.

17. The method of claim 16, further comprising:
    activating a second select line coupled to the first pixel in the first row to activate a row select transistor in the first pixel in the first row, to simultaneously activate a reset transistor in a fourth pixel in a fourth row and to simultaneously activate a transfer transistor in the second pixel in the second row.

18. The method of claim 17, further comprising:
    activating a third select line coupled to the first pixel in the first row to activate a transfer transistor in the first pixel in the first row, to simultaneously activate a reset transistor in a fifth pixel in a fifth row and to simultaneously activate a row select transistor in the fourth pixel in the fourth row.

* * * * *